United States Patent
Saheki et al.

(10) Patent No.: US 6,963,274 B2
(45) Date of Patent: Nov. 8, 2005

(54) TRANSMITTER OF TIRE CONDITION MONITORING APPARATUS AND TIRE CONDITION MONITORING APPARATUS

(75) Inventors: Setsuhiro Saheki, Gifu-ken (JP); Yasuhisa Tsujita, Gifu-ken (JP)

(73) Assignee: Pacific Industrial Co., Ltd., Ogaki (JP)

(*) Notice: Subject to any disclaimer, the term of this patent is extended or adjusted under 35 U.S.C. 154(b) by 34 days.

(21) Appl. No.: 10/364,103

(22) Filed: Feb. 11, 2003

(65) Prior Publication Data

US 2003/0156022 A1  Aug. 21, 2003

(30) Foreign Application Priority Data

Feb. 19, 2002 (JP) .............................. 2002-041285

(51) Int. Cl.[7] .............................................. B60C 23/00
(52) U.S. Cl. ...................... 340/447; 340/442; 73/146.5
(58) Field of Search ............................... 340/447, 442; 73/146.5, 146.3, 146.2

(56) References Cited

U.S. PATENT DOCUMENTS

| | | | |
|---|---|---|---|
| 5,963,128 A | | 10/1999 | McClelland |
| 6,218,936 B1 * | | 4/2001 | Imao ........................... 340/447 |
| 6,232,875 B1 * | | 5/2001 | DeZorzi ...................... 340/442 |
| 6,243,007 B1 | | 6/2001 | McLaughlin et al. |
| 6,292,096 B1 * | | 9/2001 | Munch et al. ............... 340/445 |
| 6,486,773 B1 * | | 11/2002 | Bailie et al. ................. 340/445 |
| 6,518,875 B2 * | | 2/2003 | DeZorzi ...................... 340/442 |
| 6,571,481 B1 * | | 6/2003 | Weiss ........................... 33/203 |
| 6,662,642 B2 * | | 12/2003 | Breed et al. ................... 73/146 |

FOREIGN PATENT DOCUMENTS

| | | |
|---|---|---|
| EP | 0 982 159 A | 3/2000 |
| EP | 03 00 2627 | 5/2003 |
| JP | 2000-62420 | 2/2000 |
| WO | WO 94 20317 A | 9/1994 |

* cited by examiner

Primary Examiner—John Tweel, Jr.
(74) Attorney, Agent, or Firm—Colin P. Cahoon; Chad E. Walter; Carstens & Cahoon, LLP

(57) ABSTRACT

Transmitters of a tire condition monitoring apparatus that monitors condition of vehicle tires. Each transmitter has a measuring sensor, a transmission circuit, a vehicle speed sensor and a controller. The measuring sensor measures condition of the corresponding tire. The transmission circuit periodically transmits data representing the tire condition. The vehicle speed sensor detects moving of the vehicle. The controller sets a delay time, the delay time being a period from when the vehicle speed sensor detects moving of the vehicle to when the data representing the condition of the corresponding tire is transmitted. The delay time varies from one transmitter to another.

19 Claims, 5 Drawing Sheets

TRANSMITTER OF TIRE CONDITION MONITORING APPARATUS AND TIRE CONDITION MONITORING APPARATUS

BACKGROUND OF THE INVENTION

The present invention relates to a transmitter of a tire condition monitoring apparatus that permits a driver in a vehicle passenger compartment to check the conditions of tires, such as the air pressure, and to a tire condition monitoring apparatus.

Wireless tire condition monitoring apparatuses that allow a driver in a vehicle passenger compartment to check the conditions of vehicle tires have been proposed. One such monitoring system includes transmitters and a receiver. Each transmitter is located in one of the wheels and the receiver is located in the body frame of the vehicle. Each transmitter detects the conditions, such as air pressure and the temperature of the associated tire, and wirelessly transmits the detected information at predetermined intervals. The receiver receives data from the transmitters and displays the conditions of the tires, for example, on a display located in front of the driver's seat.

To extend the life of batteries, apparatuses that do not carry out data transmission when the vehicle is not moving have been provided. In such an apparatus, data transmission is resumed immediately after movement of the vehicle is detected.

Specifically, all the transmitters start transmitting data at the same time after movement of the vehicle is detected. Therefore, radio waves from the transmitters interfere with one another. This hinders the receiver from correctly receiving data from the transmitters. Particularly, in a vehicle having a great number of tires, such as trucks and buses, reception of data is more difficult.

SUMMARY OF THE INVENTION

Accordingly, it is an objective of the present invention to provide a transmitter of a tire condition monitoring apparatus that permits a receiver to correctly receive data and to provide a tire condition monitoring apparatus.

To achieve the foregoing and other objectives and in accordance with the purpose of the present invention, transmitters of a tire condition monitoring apparatus that monitors condition of vehicle tires are provided. Each transmitter is provided in one of the tires. Each transmitter includes measuring means for measuring a condition of the corresponding tire, transmitting means for periodically transmitting data representing the tire condition, detecting means for detecting moving of the vehicle, and setting means for setting a delay time, the delay time being a period from when the detecting means detects moving of the vehicle to when the data representing the condition of the corresponding tire is transmitted. The delay time varies from one transmitter to another.

The present invention also provides a tire condition monitoring apparatus that monitors a condition of vehicle tires. The apparatus has transmitters and a receiver. Each transmitter is provided in one of the tires. Each transmitter includes measuring means for measuring a condition of the corresponding tire, transmitting means for periodically transmitting data representing the tire condition, detecting means for detecting moving of the vehicle, and setting means for setting a delay time, the delay time being a period from when the detecting means detects moving of the vehicle to when the data representing the condition of the corresponding tire is transmitted. The delay time varies from one transmitter to another. The receiver receives data transmitted by the transmitters and processes the received data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to one embodiment of the present invention will now be described with reference to FIGS. 1 to 6. The apparatus 1 is used in a vehicle 10, such as an automobile.

Figure 1:
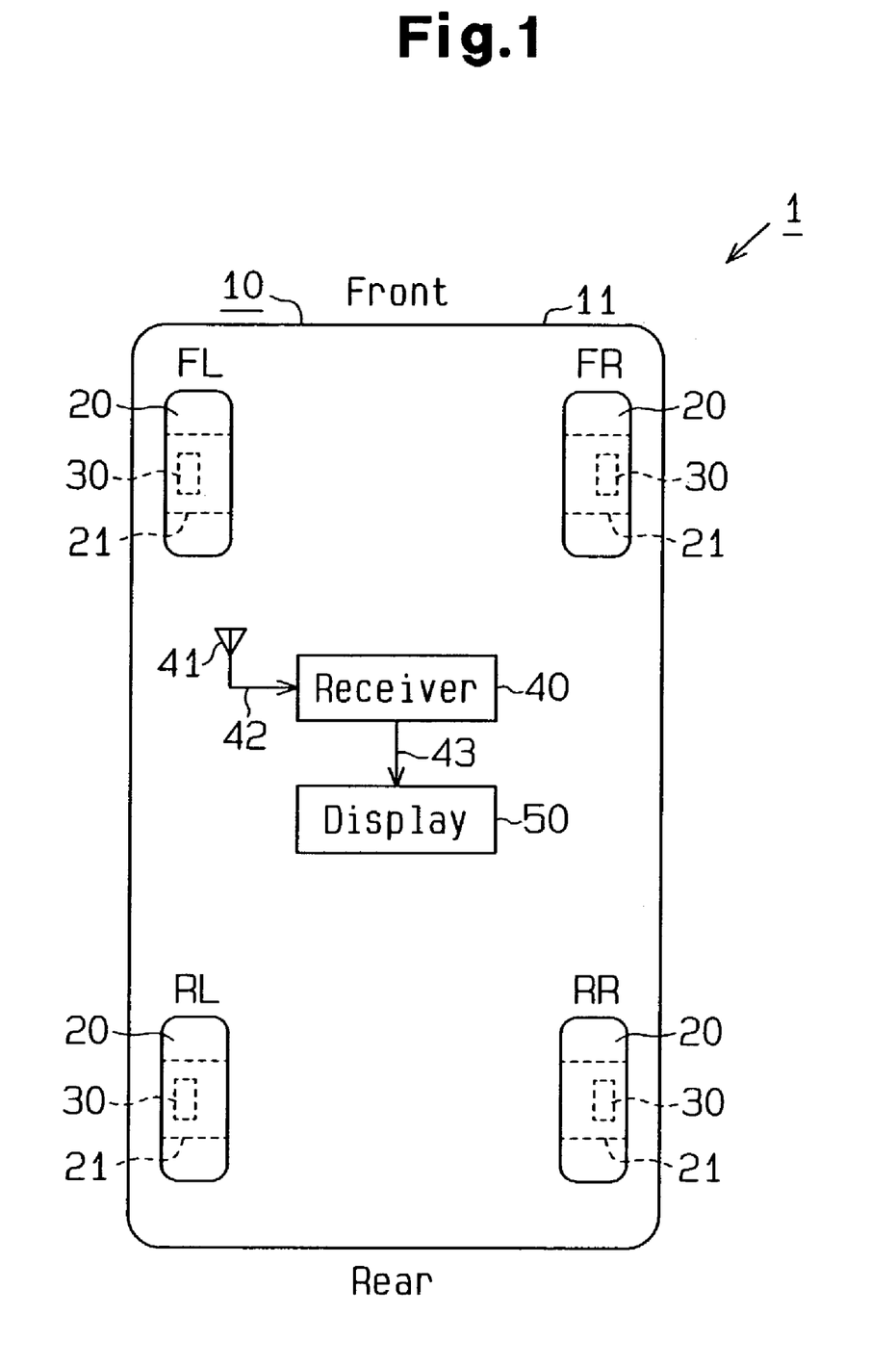
FIG. 1 is a block diagram showing a tire condition monitoring apparatus according to one embodiment of the present invention.

As shown in FIG. 1, the tire condition monitoring apparatus 1 includes four transmitters 30 and a receiver 40. The each transmitter 30 is located in one of the tires 20 of the vehicle 10. The transmitters 30 are located in the front left tire 20 (FL), the front right tire 20 (FR), the rear left tire 20 (RL), and the rear right tire 20 (RR), respectively. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the internal pressure and the internal temperature of the tire 20. The transmitter 30 then wirelessly transmits data containing air pressure data and temperature data to the receiver 40.

The receiver 40 is located at a predetermined position on the body frame 11 and is activated by electricity of a battery (not shown) of the vehicle 10. The receiver 40 is connected to a reception antenna 41 with a cable 42. The cable 42 is preferably a coaxial cable, which is influenced little by noise. The receiver 40 receives data transmitted by the transmitters 30 through the reception antenna 41.

A display 50 is located in the view of the driver of the vehicle 10, for example, in the passenger compartment. The display 50 is connected to the receiver with a cable 43.

Figure 2:
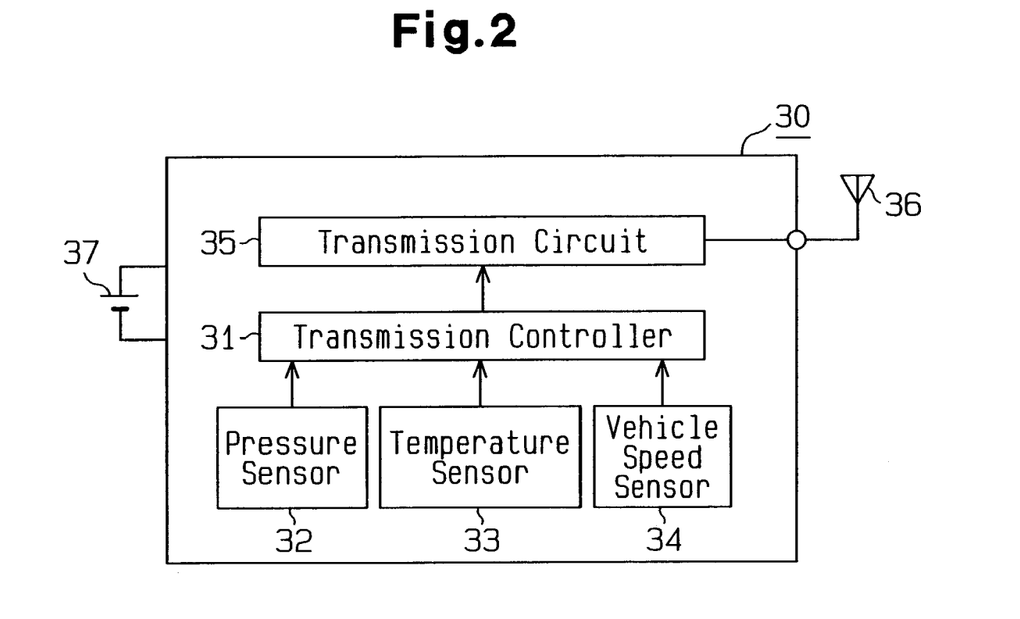
FIG. 2 is a block diagram showing a transmitter in the monitoring apparatus of FIG. 1.

As shown in FIG. 2, each transmitter 30 includes a transmission controller 31, which is a microcomputer. The transmission controller 31, which functions as a computation device, includes, for example, a central processing unit (CPU), a read only memory (ROM), and a random access memory (RAM). A unique ID code is registered in an internal memory, for example, the ROM, of the transmission controller 31. Each transmitter 30 has a unique ID code. The ID code is used to distinguish the associated transmitter 30 from the other three transmitters 30.

Each tire 20 accommodates a measurement device, which is a pressure sensor 32 in this embodiment. Each pressure sensor 32 measures the internal air pressure of the associated tire 20. Air pressure data obtained through the measurement is sent to the transmission controller 31. Each tire 20 accommodates another measurement device, which is a temperature sensor 33 in this embodiment. Each temperature sensor 33 measures the internal temperature of the associated tire 20. Temperature data obtained through the measurement is sent to the transmission controller 31. Each transmitter 30 includes a detection device, which is a vehicle speed sensor 34, in this embodiment. The vehicle speed sensors 34 are capacitance type motion sensors. The capacitance of each vehicle speed sensor 34 changes the centrifugal force based on rotation of an acceleration sensor or of the corresponding tire 20. Data of the vehicle speed detected by each vehicle speed sensor 34 is sent to the corresponding transmission controller 31.

Each transmission controller 31 sends the air pressure data, the temperature data, and the registered ID code to a transmission circuit 35. The transmission circuit 35 wirelessly transmits transmission data containing the air pressure data, the temperature data, and the ID code to the receiver 40 through a transmission antenna 36. Each transmitter 30 is provided with a battery 37. The transmitter 30 is driven by electricity of the battery 37.

Figure 3:
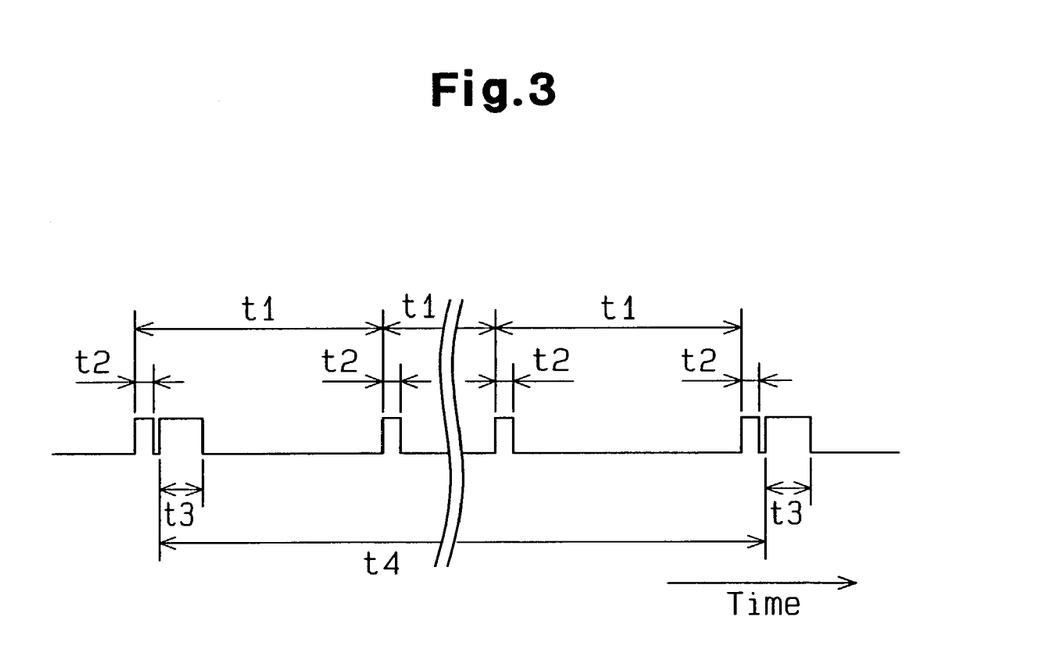
FIG. 3 is a timing chart showing operation of the transmitter shown in FIG. 2.

As shown in FIG. 3, each transmission controller 31 commands the pressure sensor 32 and the temperature sensor 33 to perform measurement at predetermined measurement intervals t1 (in this embodiment every fifteen seconds). A measurement operation period t2 shown in FIG. 3 is a period from when the pressure sensor 32 and the temperature sensor 33 start measurement until when the resultant data is processed by the transmission controller 31.

The transmission controller 31 counts the number of times that the pressure sensor 32 and the temperature sensor 33 perform measurement and commands the transmission circuit 35 to perform transmission when the number of measuring times reaches a reference number (forty in this embodiment). In this embodiment, the measurement interval t1 of the pressure sensor 32 and the temperature sensor 33 is fifteen seconds. Therefore, as shown in FIG. 3, the transmission controller 31 commands the transmission circuit 35 to transmit signals at a predetermined transmission interval t4, which is ten minutes (10 minutes=15 seconds×40) in this embodiment.

A transmission operation time t3 in FIG. 3 represents a period during which the transmission circuit 35 is performing a transmission. Therefore, the transmitter 30 is in a sleep state and consumes little electricity of the battery 37 other than during the measurement operation period t2 and the transmission operation time t3.

The measurement interval t1 and the transmission interval t4 are determined by considering the capacity of the battery 37, the power consumption of the transmitter 30, and the measurement operation period t2 and the transmission operation time t3 of the transmitters 30. It has been confirmed that the life of the battery 37 is more than ten years if the battery 37 has a capacity of 1000 mAh, the measurement interval t1 is fifteen seconds, and the transmission interval t4 is ten minutes.

When the vehicle 10 is moving, each transmission controller 31 measures the vehicle speed and transmits data containing the vehicle speed based on the speed detection by the vehicle speed sensor 34. When the vehicle 10 is not moving, the transmission controller 31 measures the vehicle speed based on the speed detection by the vehicle speed sensor but does not transmit data.

Figure 4:
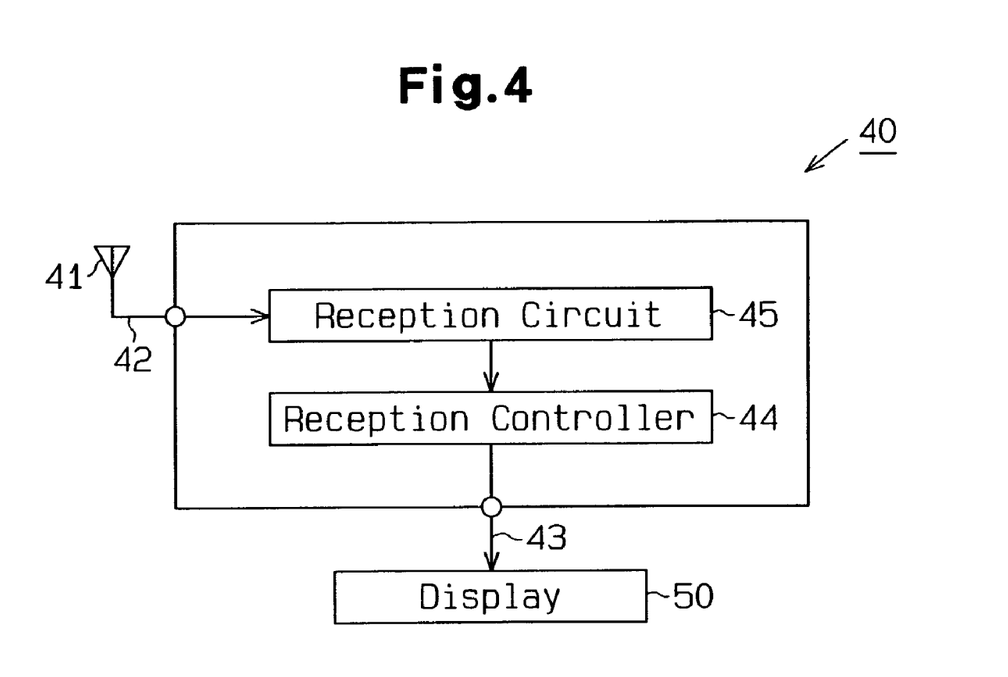
FIG. 4 is a block diagram showing the receiver in the monitoring apparatus of FIG. 1.

As shown in FIG. 4, the receiver 40 includes a reception controller 44 and a reception circuit 45. The reception controller 44 processes data received with the reception antenna 41. The reception controller 44, which is, for example, a microcomputer, includes a CPU, a ROM, and a RAM. The reception circuit 45 receives data transmitted by the transmitters 30 through the reception antenna 41. The reception circuit 45 demodulates and decodes the received data and sends the data to the reception controller 44.

Based on the received data, the reception controller 44 obtains the internal pressure and the internal temperature of the tire 20 that is associated with the transmitter 30 that is the source of the received data. The reception controller 44 displays the data regarding the condition of the tire 20, such as the internal pressure and the internal temperature, on the display 50. Particularly, when there is an abnormality in the internal pressure of the tire 20, the reception controller 44 displays a warning on the display 50. The receiver 40 is activated when a key switch (not shown) is turned on.

Operations of the transmitters 30 based on the state of the vehicle 10 (non-moving state, moving state) will now be described with reference to the flowchart of FIG. 5.

In step S1, the transmission controller 31 determines whether the vehicle 10 is moving based on data detected by the vehicle speed sensor 34. If the vehicle 10 is moving, the transmission controller 31 proceeds to step S4. If the vehicle 10 is not moving, the transmission controller 31 proceeds to step S2.

In steps S2 and S3, the pressure sensor 32 and the temperature sensor 33 measures the internal pressure and the internal temperature of the tire 20 every fifteen seconds. That is, even if the vehicle 10 is not moving, the internal pressure and the internal temperature of the tire 20 are measured every fifteen seconds.

In step S4, a count value C is reset to zero.

In step S5, the transmission controller 31 computes a delay time DT, based on which corresponding transmitter 30 transmits data. The delay time DT refers to a period from when moving of the vehicle 10 is detected until when the data is transmitted. The delay time DT is computed based on the unique ID code that has been registered in the ROM of the transmission controller 31 in advance. The ID codes are different from one transmitter 30 to another. Therefore, the delay times DT, which are computed based on the ID codes, are different from one transmitter 30 to another. The delay times DT are equal to or shorter than one minute.

In step S6, the transmission controller 31 determines whether the delay time DT, which has been computed in step S5, has elapsed.

If the outcome of step S6 is positive, that is, if the delay time DT has elapsed, the transmission controller 31 proceeds to step S7. In steps S7, the pressure sensor 32 and the temperature sensor 33 measures the internal pressure and the internal temperature of the tire. The transmission circuit 35 transmits transmission data containing the air pressure data, the temperature data, and the ID code through the transmission antenna 36.

After moving of the vehicle 10 is detected, each transmitter 30 performs the first measurement and transmission when the unique delay time DT has elapsed. Accordingly, the time of transmission is different from one transmitter 30 to another. Therefore, data from the transmitters 30 do not interfere with one another, and the receiver 40 properly receive the data.

In step S5, the delay time DT is computed to be equal to or less than one minute. Therefore, if the vehicle 10 is started after being temporarily stopped, all the transmitters 30 transmit data within one minute since when moving of the vehicle 10 is detected. Thus, within one minute since the vehicle 10 is started, the internal pressure and the internal temperature of each tire 20 are shown on the display 50.

In steps S8, S9, the pressure sensor 32 and the temperature sensor 33 measures the internal pressure and the internal temperature of the tire 20 every fifteen seconds.

Then, in step S10, one is added to the current count value C. The count value C represents the number of times the pressure sensor 32 and the temperature sensor 33 have taken a measurement.

In step S11, the transmission controller 31 determines whether the count value C has reached forty. That is, the transmission controller 31 determines whether the internal pressure and the internal temperature of the tire 20 have been measured forty times. If the outcome of step S11 is positive, that is, if the count value C has reached forty, the transmission controller 31 proceeds to step S12. If the outcome of step S11 is negative, that is, if the count value C has not reached forty, the transmission controller 31 returns to step S8.

If the count value C is determined to have reached forty in step S11, the transmission controller 31 determines that the transmission interval t4, which is ten minutes, has elapsed and resets the count value C to zero.

In step S13, the transmission circuit 35 transmits transmission data containing the air pressure data, the temperature data, and the ID code through the transmission antenna 36. Subsequently, the transmission controller 31 returns to step S8.

Figure 6:
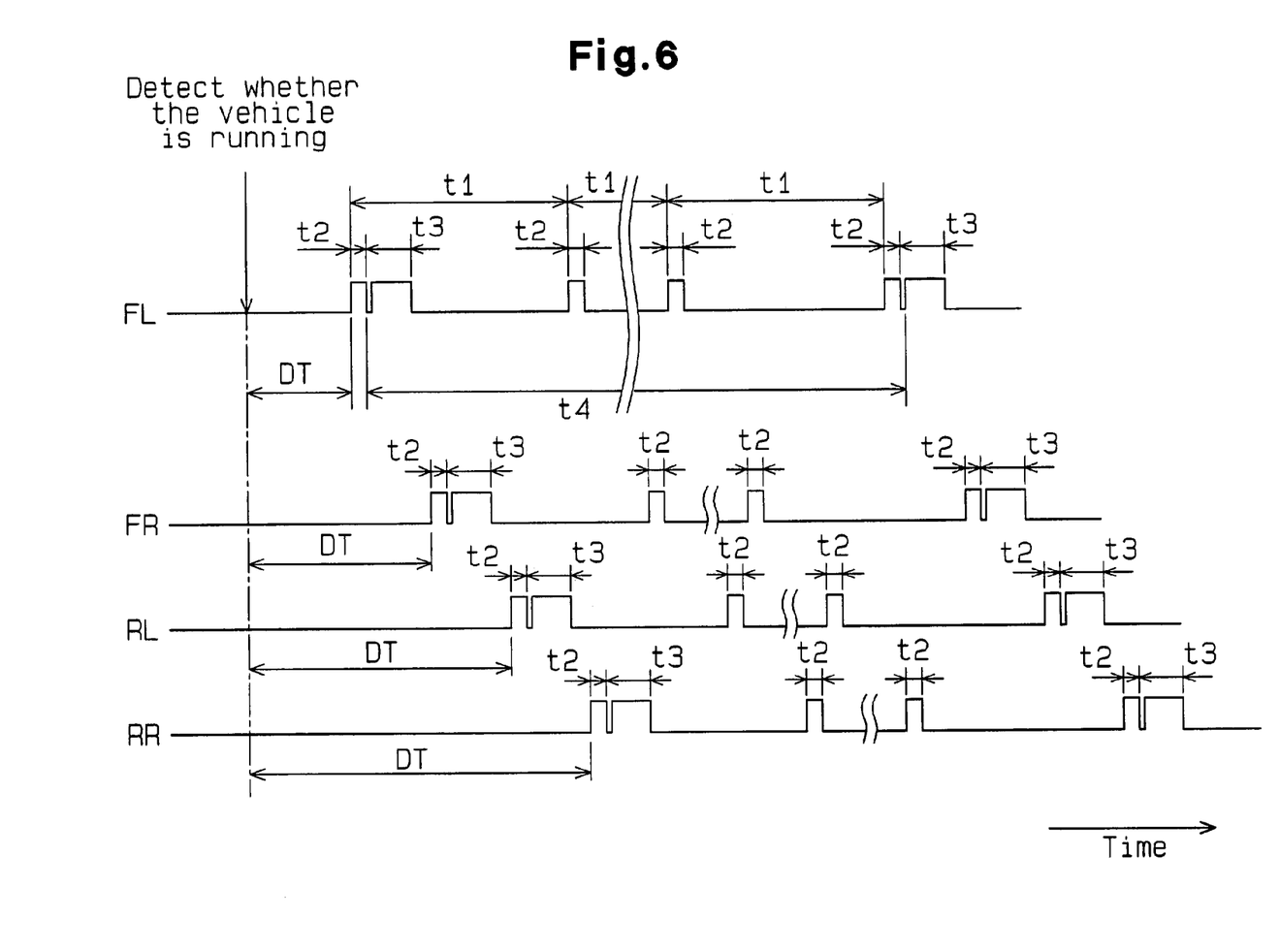
FIG. 6 is a timing chart showing operation of the transmitters after movement of the vehicle is detected.

FIG. 6 is a timing chart showing operations of the four transmitters 30 after moving of the vehicle 10 is detected. FL represents the transmitter 30 in the front left tire 20. FR represents the transmitter 30 in the front right tire 20. RL represents the transmitter 30 in the rear left tire 20. RR represents the transmitter 30 in the rear right tire 20.

When the vehicle speed sensor 34 of each transmitter 30 detects that the vehicle 10 is moving, the controller 31 of the transmitter 30 computes the delay time DT of the transmitter 30. Different delay times DT are computed for each transmitter 30. When the computed delay time DT has elapsed, the transmitter 30 performs measurement and transmission. Thereafter, while the vehicle 10 is judged to be moving, the controller 31 of each transmitter 30 measures the internal pressure and the internal temperature of the tire 20 every fifteen seconds, and the transmission circuit 35 sends data to the receiver 40 every ten minutes.

This embodiment provides the following advantages.

If the vehicle speed sensors 34 detect that the vehicle 10 is moving after the vehicle 10 is temporarily stopped, the transmission controllers 31 compute different delay times DT based on the unique ID codes registered in the ROMs. After the delay time DT of each transmitter 30, which is different for each of the transmitters 30, has elapsed, the transmitter 30 measures the internal pressure and the internal temperature of the tire 20 every fifteen seconds, and transmits data to the receiver 40 every ten minutes. Therefore, data from the transmitters 30 are not simultaneously sent to the receiver 40. As a result, since radio waves from the transmitters 30 do not interfere with one another, the receiver 40 correctly receives the data.

When the delay time DT has elapsed, the transmission controller 31 of each transmitter 30 measures the internal pressure and the internal temperature of the tire 20 and sends the transmission data containing the air pressure data, the temperature data, and the ID code to the receiver 40 from the transmission circuit 35 through the transmission antenna 36. Therefore, every time moving of the vehicle 10 is detected after stopping, data of the internal pressure and the internal temperature is shown on the display 50. Therefore, if any of the tires 20 has some kind of trouble after the vehicle 10 has been parked for an extended period, the driver is immediately informed of the trouble.

When the vehicle 10 is not moving, the transmission controller 31 measures the internal pressure and the internal temperature of the tire 20. However, the transmission controller 31 does not send transmission data containing the pressure data, the temperature data, and the ID code from the transmission circuit 35 through the transmission antenna 36. Thus, when the vehicle 10 is not moving, the power consumption of the battery 37 is suppressed. This extends the life of the battery 37.

It should be apparent to those skilled in the art that the present invention may be embodied in many other specific forms without departing from the spirit or scope of the invention. Particularly, it should be understood that the invention may be embodied in the following forms.

Figure 5:
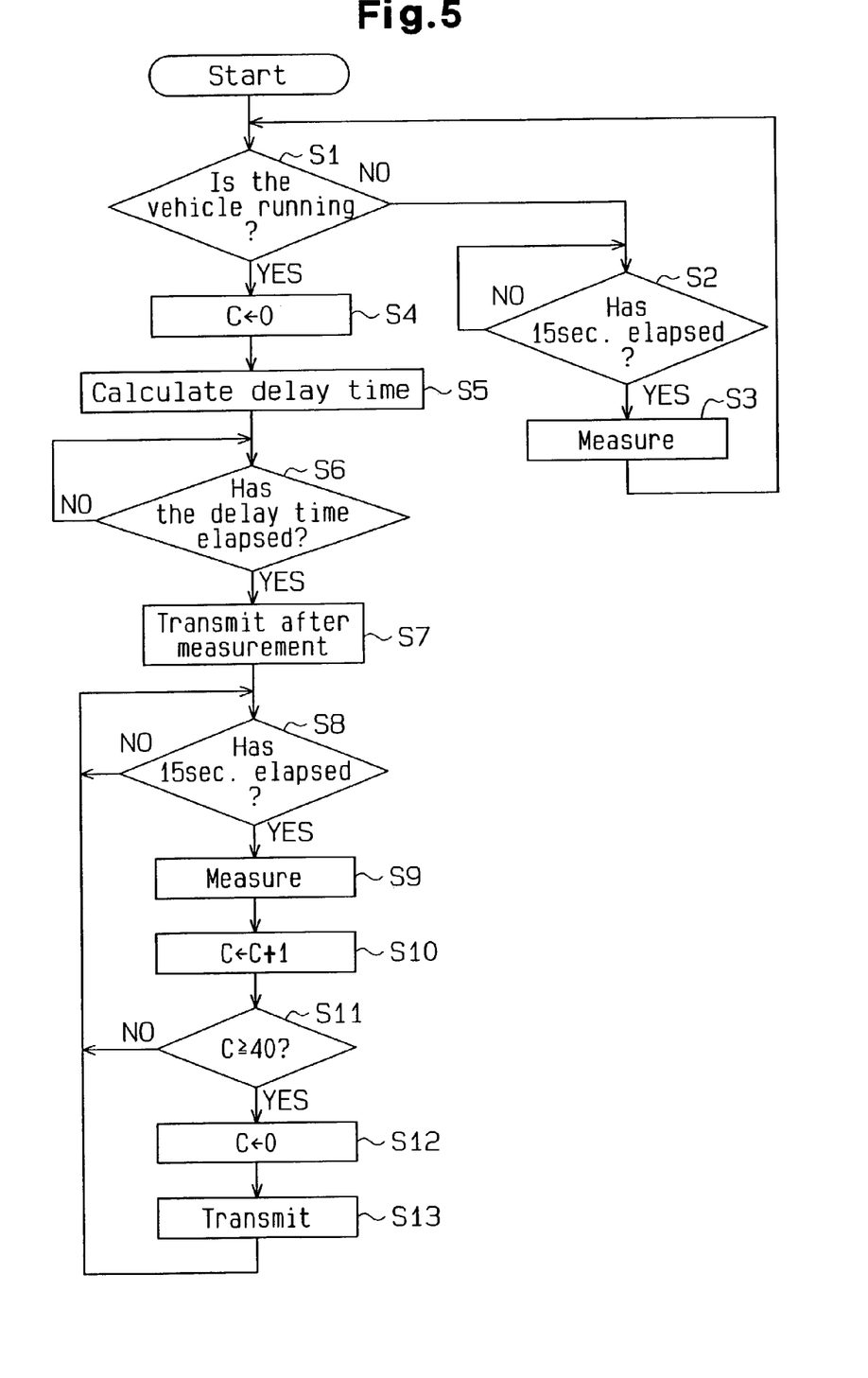
FIG. 5 is a flowchart showing operation of the transmitter shown in FIG. 2 performed according to the state of the vehicle.

In step S3 of FIG. 5, the delay time DT of each transmitter 30 may be computed based on the measured internal pressure and temperature of the tire 20. That is, since the internal pressure and the internal temperature are usually different from one tire 20 to another, the delay time DT may be computed based on the data.

A different delay time DT may be registered in the ROM of each transmitter 30. That is, the ROM of each transmitter 30 may store a delay time DT that is different from those stored in the ROM of the other transmitters 30.

When computing the delay time DT, the transmission controller 31 may use the entire ID code or a part of the ID code.

In the illustrated embodiment, the ID code, which is stored in the ROM of the transmitter 30, is used for computing the delay time DT. However, data other than the ID code, for example, a numeric data dedicated for computing the delay time DT, may be stored in the ROM.

The transmitter 30 may have a random number generating circuit, and the delay time DT may be computed using a number obtained by the random number generating circuit when moving of the vehicle 10 is detected.

A random number may be generated in each transmitter 30, and different delay time DT may be computed for each transmitter 30. In this case, a unique delay time DT is set for each transmitter 30 by limiting the range of the random number generated in each transmitter 30. For example, in a typical vehicle 10 having four tires 20, the ranges of the generated random numbers of the tires 20 may be 0–10, 11–20, 21–30, 31–40, respectively.

Instead of sending the speed detected by the vehicle speed sensor 34 to the transmission controller 31, data representing whether the speed of the vehicle 10 has been detected may be sent to the transmission controller 31.

The flowchart of FIG. 5 is executed when moving of the vehicle 10 is detected after the vehicle 10 is temporarily stopped. In a traffic hold-up, the vehicle 10 is alternately stopped and started. In this situation, when moving of the vehicle 10 is detected, the transmission controller 31 may determine whether a predetermined time (for example ten minutes) has elapsed since the last transmission before the detection of moving. If the predetermined time has not elapsed, no transmission of data is performed. In this modification, even if the vehicle 10 is caught in a traffic hold-up where the vehicle 10 is alternately started and stopped, data transmission is not performed until the predetermine time-elapses, which extends the life of the battery 37.

When the vehicle 10 is not moving, transmission need not be completely stopped. For example, when the vehicle 10 is not moving, transmission may be performed at an interval that is longer than the transmission interval t4, which is used when the vehicle 10 is moving.

When determining that a predetermined transmission condition is satisfied based on the pressure data from the pressure sensor 32 and the temperature data from the temperature sensor 33, the transmission controller 31 may perform transmission in addition to the periodical transmissions at every transmission interval t4. The transmission condition refers, for example, to abrupt changes in the internal pressure and the internal temperature of the tire and an abnormal increase of the internal temperature of the tire 20.

The measurement interval t1 is not limited to fifteen seconds. For example, the measurement interval t1 may be varied according to the type of the tires 20, to which the transmitters 30 are attached.

Whether the number of times that the pressure sensor 32 and the temperature sensor 33 perform measurement has reached a reference number is used for determining whether the transmission interval t4 has elapsed. In this embodiment, the reference number is forty. However, the reference number may be changed.

When there is an abnormality in the internal pressure or the internal temperature of the tire 20, the abnormality may be indicated by a sound. In addition, a speaker that is mounted on the vehicle 10 in advance may be used as an informing device.

Air pressure data transmitted by the transmitter 30 may indicate the value of the air pressure or whether the air pressure is within a permissible range.

Other than four-wheeled vehicles, the present invention may be applied to two-wheeled vehicles, such as bicycles and motor cycles, multi-wheeled busses, multi-wheeled towed vehicles and industrial vehicles, such as forklifts. When the present invention is applied to a towed vehicle, the receiver 40 and the display 50 are provided in the tractor.

The temperature sensor 33 may be omitted. In this case, the transmitter 30 has the minimum functions. This reduces the cost.

The present invention may be applied to a tire condition monitoring apparatus having four receiving antennas 41 each corresponding to one of the transmitters 30.

The internal pressure and the internal temperature of the tires 20 need not be measured while the vehicle 10 is not moving. This extends the life of the battery 37.

In this description, "measurement and transmission at a predetermined interval" and "periodic measurement and transmission" do not indicate that the measurement interval and the transmission interval have to be completely constant. That is, the scope of the expressions includes slight changes in the measurement intervals and the transmission intervals.

Therefore, the present examples and embodiments are to be considered as illustrative and not restrictive and the invention is not to be limited to the details given herein, but may be modified within the scope and equivalence of the appended claims.

What is claimed is:

1. Transmitters of a tire condition monitoring apparatus that monitors condition of vehicle tires, wherein each transmitter is provided in one of the tires, each transmitter comprising:
    at least one measuring device for measuring a condition of the corresponding tire;
    a transmitting system on each measuring device for periodically transmitting data representing the measured tire condition, wherein each of said transmitting systems periodically transmits said data during a same time interval;
    a detecting device for detecting moving of the vehicle; and
    a delay mechanism for computing a delay time, the delay time being a period from when the detecting device detects moving of the vehicle to when the data representing the condition of the corresponding tire is transmitted, wherein the computed delay time is always different from one transmitter to each of the other transmitters, and wherein the transmitting systems of all the transmitters first transmit the data after the respective delay times, wherein said delay times are different from each other, and wherein said delay times have elapsed from when the vehicle starts moving, and then the transmitters periodically transmit the data at the same time intervals.

2. The transmitters according to claim 1, wherein the delay mechanism of each transmitter computes the delay time based on random numbers.

3. The transmitters according to claim 1, wherein each transmitter further comprises a memory that stores information unique to the transmitter in advance, wherein the delay mechanism computes the delay time based on the unique information.

4. The transmitters according to claim 3, wherein the unique information is an identification code assigned to each transmitter.

5. The transmitters according to claim 1, wherein each transmitter comprises a memory that stores a delay time unique to the transmitter in advance.

6. The transmitters according to claim 1, wherein the delay mechanism of each transmitter computes the delay time based on tire condition measured by the corresponding measuring device.

7. The transmitters according to claim 1, wherein, when the vehicle is not moving, the transmitting system of each transmitter stops transmitting the data representing the tire condition.

8. A tire condition monitoring apparatus that monitors one or more conditions of vehicle tires, the apparatus comprising:
    transmitters, each provided in one of the tires, wherein each transmitter comprises:
        at least one measuring device for measuring a condition of the corresponding tire;
        a transmitting system on each measuring device for periodically transmitting data representing the measured tire condition, wherein each of said transmitting systems periodically transmits said data during a same time interval;
        a detecting device for detecting moving of the vehicle; and
        a delay mechanism for computing a unique delay time, the unique delay time being a period from when the detecting device detects moving of the vehicle to when the data representing the condition of the corresponding tire is transmitted, wherein the delay times have elapsed from when the vehicle starts moving, and the transmitting systems of all the transmitters first transmit the data after the respective unique delay times, and then the transmitters periodically transmit the data at the same time intervals; and a receiver, which receives data transmitted by the transmitters and processes the received data.

9. The apparatus according to claim 8, wherein the receiver is connected to an informing device that informs passengers of tire condition.

10. The apparatus according to claim 8, wherein the delay mechanism of each transmitter computes the delay time based on random numbers.

11. The apparatus according to claim 8, wherein each transmitter further comprises a memory that stores information unique to the transmitter in advance, wherein the delay mechanism computes the delay time based on the unique information.

12. The apparatus according to claim 11, wherein the unique information is an identification code assigned to each transmitter.

13. The apparatus according to claim 8, wherein each transmitter comprises a memory that stores a delay time unique to the transmitter in advance.

14. The apparatus according to claim 8, wherein the delay mechanism of each transmitter computes the delay time based on a tire condition measured by the corresponding measuring device.

15. The apparatus according to claim 8, wherein, when the vehicle is not moving, the transmitting system of each transmitter stops transmitting the data representing the tire condition.

16. Transmitters of a tire condition monitoring apparatus that monitors condition of vehicle tires, wherein each transmitter is provided in one of the tires, each transmitter comprising:

at least one measuring sensor for measuring a condition of the corresponding tire;

a transmission circuit for periodically transmitting data representing the measured tire condition, wherein said data from each sensor is transmitted at the same time interval;

a vehicle speed sensor for detecting moving of the vehicle; and a controller for setting a delay time unique to each transmitter, the delay time being a period from when the vehicle speed sensor detects moving of the vehicle to when the data representing the condition of the corresponding tire is transmitted, wherein the delay time varies from one transmitter to another.

17. The transmitters according to claim 1 wherein the at least one measuring device comprises a pressure sensor.

18. The transmitters according to claim 17 further comprising a second measuring device comprising a temperature sensor.

19. The transmitters according to claim 1 wherein the transmitting system comprises a transmission controller and a transmission circuit.

* * * * *